US007334043B2

(12) United States Patent
Daigle et al.

(10) Patent No.: US 7,334,043 B2
(45) Date of Patent: Feb. 19, 2008

(54) EXTENDING FUNCTIONALITY OF WORKFLOW APPLICATIONS USING INSTANT MESSAGING (IM)

(75) Inventors: Brian K. Daigle, Marietta, GA (US); W. Todd Daniell, Marietta, GA (US); Joel (Hassan) Davis, Marietta, GA (US); Larry G. Kent, Jr., Loganville, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 914 days.

(21) Appl. No.: 10/408,341

(22) Filed: Apr. 7, 2003

(65) Prior Publication Data

US 2004/0064696 A1 Apr. 1, 2004

Related U.S. Application Data

(63) Continuation-in-part of application No. 10/368,099, filed on Feb. 18, 2003, which is a continuation-in-part of application No. 10/274,405, filed on Oct. 18, 2002, now abandoned, application No. 10/408,341, which is a continuation-in-part of application No. 10/274,408, filed on Oct. 18, 2002, now Pat. No. 6,976,092, application No. 10/408,341, which is a continuation-in-part of application No. 10/274,478, filed on Oct. 18, 2002, now Pat. No. 7,035,942, application No. 10/408,341.

(60) Provisional application No. 60/426,145, filed on Nov. 14, 2002, provisional application No. 60/426,146, filed on Nov. 14, 2002, provisional application No. 60/426,422, filed on Nov. 14, 2002, provisional application No. 60/426,432, filed on Nov. 14, 2002, provisional application No. 60/426,440, filed on Nov. 14, 2002, provisional application No. 60/419,613, filed on Oct. 17, 2002, provisional application No. 60/416,916, filed on Oct. 8, 2002, provisional application No. 60/411,336, filed on Sep. 17, 2002.

(51) Int. Cl.
*G06F 15/16* (2006.01)

(52) U.S. Cl. ........................ 709/231; 709/203; 709/206

(58) Field of Classification Search ........ 709/204–207, 709/203, 231
See application file for complete search history.

(56) References Cited

U.S. PATENT DOCUMENTS

| | | | | |
|---|---|---|---|---|
| 5,754,857 | A * | 5/1998 | Gadol | 709/203 |
| 6,853,634 | B1 * | 2/2005 | Davies et al. | 370/349 |
| 7,051,071 | B2 * | 5/2006 | Stewart et al. | 709/204 |
| 7,120,455 | B1 * | 10/2006 | Chen et al. | 455/466 |

OTHER PUBLICATIONS

M. Day, et al.; A Model for Presence and Instant Messaging; Feb. 2000; pp. 1-26.
W3C, Editors: T. Bray, J. Paoli, CM Sperbert-McQueen and E. Maler; Extensible Markup Language (XML) 1.0 (Second Edition)—W3C Recommendation Oct. 6, 2000; pp. 1-59.
IBM; IBM Lotus Workflow 3.0.1; 2002; pp. 1-4.

(Continued)

*Primary Examiner*—Phuoc H Nguyen
(74) *Attorney, Agent, or Firm*—Thomas, Kayden, Horstemeyer & Risley, LLP

(57) ABSTRACT

Plug-ins for instant messaging (IM) systems are described. By using plug-ins in conjunction with IM systems, the functionality of IM systems may be greatly extended. Specifically, in business applications, such as workflow processes, IM provides a more reliable approach to determining actual delivery of messages.

8 Claims, 18 Drawing Sheets

OTHER PUBLICATIONS

J. Miller, P. Saint-Andre; XMPP Instant Messaging—draft-miller-xmpp-im-00; Jun. 21, 2002; pp. 1-65.

M. Day, et al.; Instant Messaging / Presence Protocol Requirements; Feb. 2000; pp. 1-26.

* cited by examiner

EXTENDING FUNCTIONALITY OF WORKFLOW APPLICATIONS USING INSTANT MESSAGING (IM)

CROSS REFERENCE TO RELATED APPLICATIONS

This application claims the benefit of U.S. provisional patent application Ser. Nos. 60/411,336, filed Sep. 17, 2002; 60/416,916, filed Oct. 8, 2002; 60/419,613, filed Oct. 17, 2002; 60/426,145, filed Nov. 14, 2002; 60/426,146, filed Nov. 14, 2002; 60/426,422, filed Nov. 14, 2002; 60/426,432, filed Nov. 14, 2002; and 60/426,440, filed Nov. 14, 2002. These provisional patent applications are incorporated herein by reference as if set forth in their entireties.

Additionally, this application is a continuation-in-part (CIP) of U.S. patent application Ser. No. 10/274,405, filed Oct. 18, 2002, now abandoned which claims the benefit of U.S. provisional patent application Ser. No. 60/411,336, filed Sep. 17, 2002, and U.S. provisional patent application Ser. No. 60/419,613, filed on Oct. 17, 2002. This application is also a CIP of Ser. No. 10/274,408, filed Oct. 18, 2002, now U.S. Pat. No. 6,976,092 which claims the benefit of U.S. provisional patent application Ser. No. 60/411,336, filed Sep. 17, 2002, and U.S. provisional patent application Ser. No. 60/419,613, filed on Oct. 17, 2002. This application is also a CIP of Ser. No. 10/274,478, now U.S. Pat. No. 7,035,942 filed Oct. 18, 2002, which claims the benefit of U.S. provisional patent application Ser. No. 60/411,336, filed Sep. 17, 2002, and U.S. provisional patent application Ser. No. 60/419,613, filed on Oct. 17, 2002. This application is also a CIP of Ser. No. 10/368,099, filed Feb. 18, 2003, which claims the benefit of U.S. provisional patent application Ser. No. 60/419,613, filed Oct. 17, 2002, which is entirely incorporated herein by reference.

All of these patent applications are incorporated herein by reference as if set forth in their entireties.

FIELD OF INVENTION

The present invention relates generally to the Internet and, more particularly, to instant messaging (IM).

BACKGROUND

Currently, instant messaging (IM) systems permit real-time communications between users. Typically, the real-time communications include text messaging, voice chat, and video conferencing. While the text messaging, voice chat, and video conferencing may be sufficient for certain interactions between users, these modes provide relatively limited functionality for other applications.

Thus, a heretofore-unaddressed need exists in the industry to extend the functionality of IM systems.

SUMMARY

The present disclosure provides systems and methods for extending functionality of instant messaging (IM) systems.

Briefly described, in architecture, one embodiment of the system comprises a workflow transport-protocol object (TPO) and an IM server. The workflow TPO is adapted to receive workflow requests from a workflow server and format the workflow requests to generate an IM request data stream. In one embodiment, the workflow TPO is further adapted to convey the IM request data stream to the IM server. The IM server is adapted to receive the conveyed IM request data stream from the workflow TPO and convey the IM request data stream to an IM client.

Another embodiment of the system comprises an IM client and a workflow plug-in. The IM client is adapted to receive a workflow request. The workflow plug-in is adapted to process the workflow request.

The present disclosure also provides methods for extending functionality of IM systems. In this regard, one embodiment of the method comprises the steps of receiving a workflow request, which is directed to a specified IM address, from a workflow server and formatting the received workflow request to generate an IM data stream.

Another embodiment of the method comprises the steps of receiving a workflow request at an IM client, determining if the IM client is registered with a workflow plug-in, and executing the workflow plug-in in response to determining that the IM client is registered with the workflow plug-in.

Other systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 1:
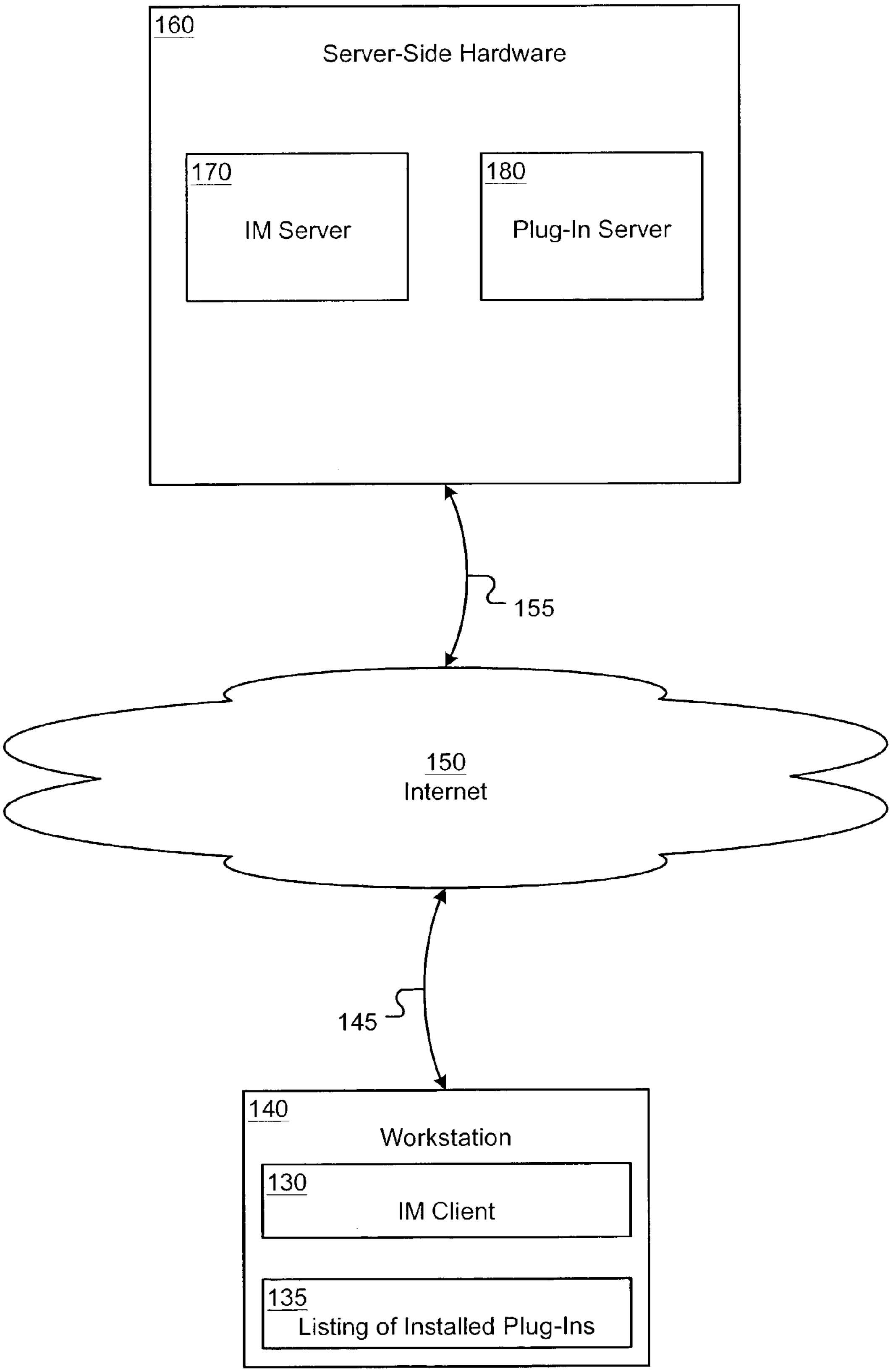
FIG. 1 is a block diagram showing a client-server environment having an instant messaging (IM) client with extended functionality residing on a workstation.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

FIG. 1 is a block diagram showing a client-server environment having an instant messaging (IM) client 130 with extended functionality. The IM client 130 resides on a workstation 140. As shown in FIG. 1, in one embodiment, the workstation 140 is connected to the Internet 150, which serves as a backbone for communication between the workstation 140 and server-side hardware 160. As is known, the server-side hardware 160 may be connected to the Internet through a digital subscriber line (DSL) service, an integrated services digital network (ISDN) service, an analog dial-up service, Ethernet, T-1, or any other service for transmitting data through a network. Since connections to the Internet 150 are known in the art, further discussion of such connections is omitted here. The workstation 140 may also be connected to the Internet through similar connections. In one embodiment, the server-side hardware 160 is adapted to run an IM server 170 and a plug-in server 180. Thus, in operation, when the user logs in at the IM client 130, a communication pathway is established between the IM client 130 and the IM server 170. The communication pathway permits server-mediated IM sessions or access to other IM server functions by the IM client 130, though server interaction is not necessarily included in all communications for some embodiments.

Figure 2:
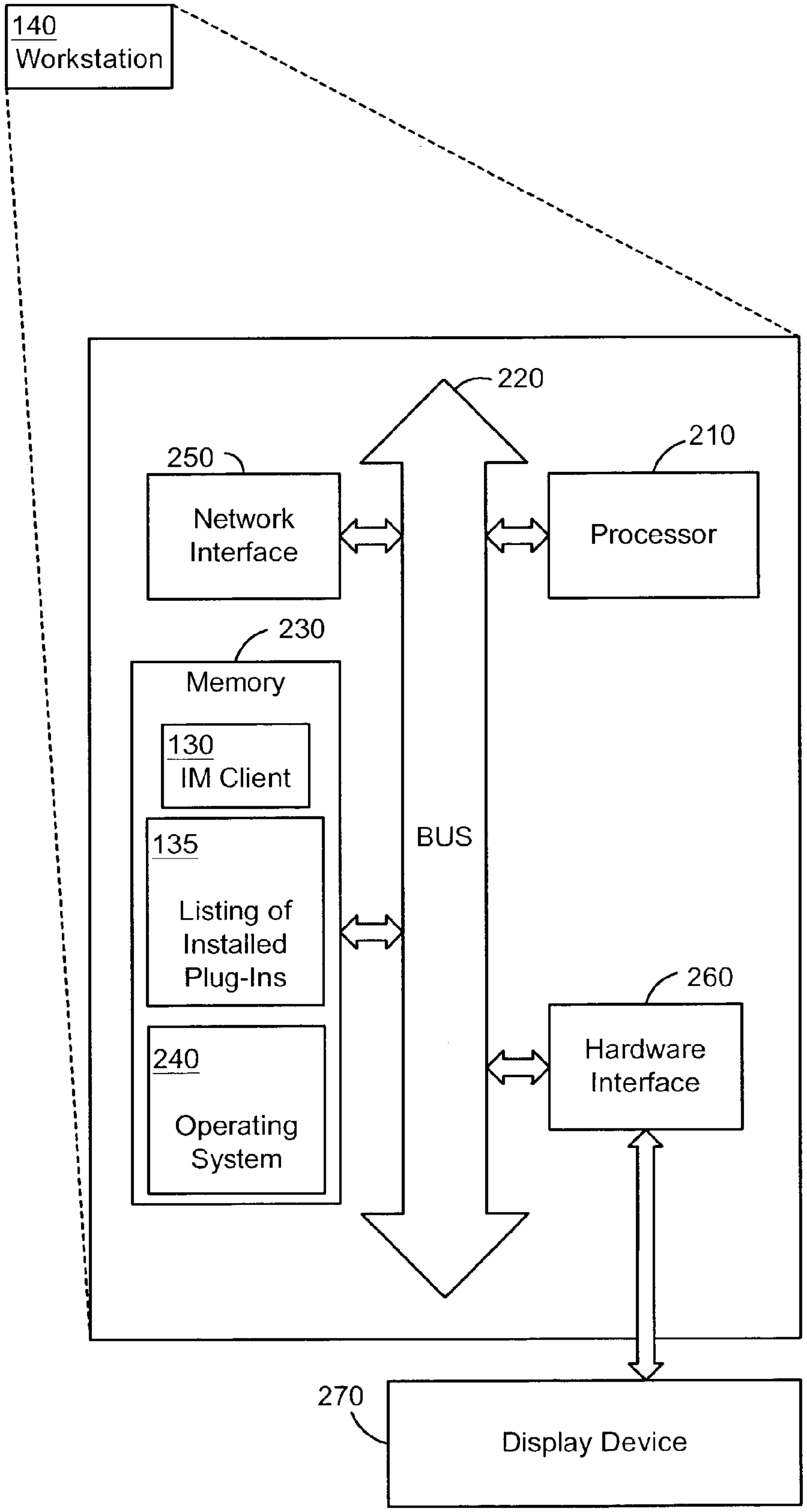
FIG. 2 is a block diagram showing components of the workstation of FIG. 1 in greater detail.

FIG. 2 is a block diagram showing components of the workstation 140 in greater detail. As shown in FIG. 2, one embodiment of the workstation 140 comprises a processor 210, memory 230, which may be volatile memory, nonvolatile memory, or a combination of both, a network interface 250, and a hardware interface 260, which are all interconnected through a local bus 220. The hardware interface 260 is adapted to interface external components, such as a display device 270, to the bus 220. The network interface 250 is adapted to interface the workstation 140 to the Internet 150 through connection 145 as shown in FIG. 1. The embodiment of FIG. 2 shows the IM client 130 loaded in memory 230. Thus, the workstation 140 is adapted to engage in IM communications. It should, however, be appreciated that the workstation 140 may be adapted for additional functions, such as Internet-based game playing or execution of other interactive software (not shown). The memory also includes a listing of installed plug-ins 135 and an operating system 240. In one embodiment, the listing of installed plug-ins 135 is configured as a predefined directory in which the installed plug-ins are stored. Since the IM client 130 provides greater functionality and versatility than a standard web browser, plug-ins for the IM client 130 are preferably stored in a separate listing from the plug-ins for web browsers. In an example embodiment, the IM plug-ins are component object model (COM) objects that are downloadable from the plug-in server 180 (FIG. 1). In this regard, for a Windows™-based system, a plug-in may be a COM object that registers a globally-unique identifier (e.g., a CLSID key that identifies the COM object) in the Windows™ registry under a directory in "HKEY_LOCAL_MACHINE/SOFTWARE/." The CLSID key identifies the COM object that exports the plug-in interface for use by the IM client 130. Since COM objects and CLSID keys are known to those of skill in the art, further discussion of COM objects and CLSID keys are omitted here. It is, however, sufficient to note that, once the IM client 130 is registered with a particular plug-in, the plug-in may be launched by the IM client 130 to process incoming data associated with the plug-in. Greater details of the operation of the plug-in are discussed below. It should be appreciated that a helper application, which is a separate, free-standing software application, may be used in lieu of a plug-in. Thus, it should be appreciated that the following discussion of plug-ins is also applicable to helper applications, as well as other implementations for providing extended functionality.

Figure 3A:
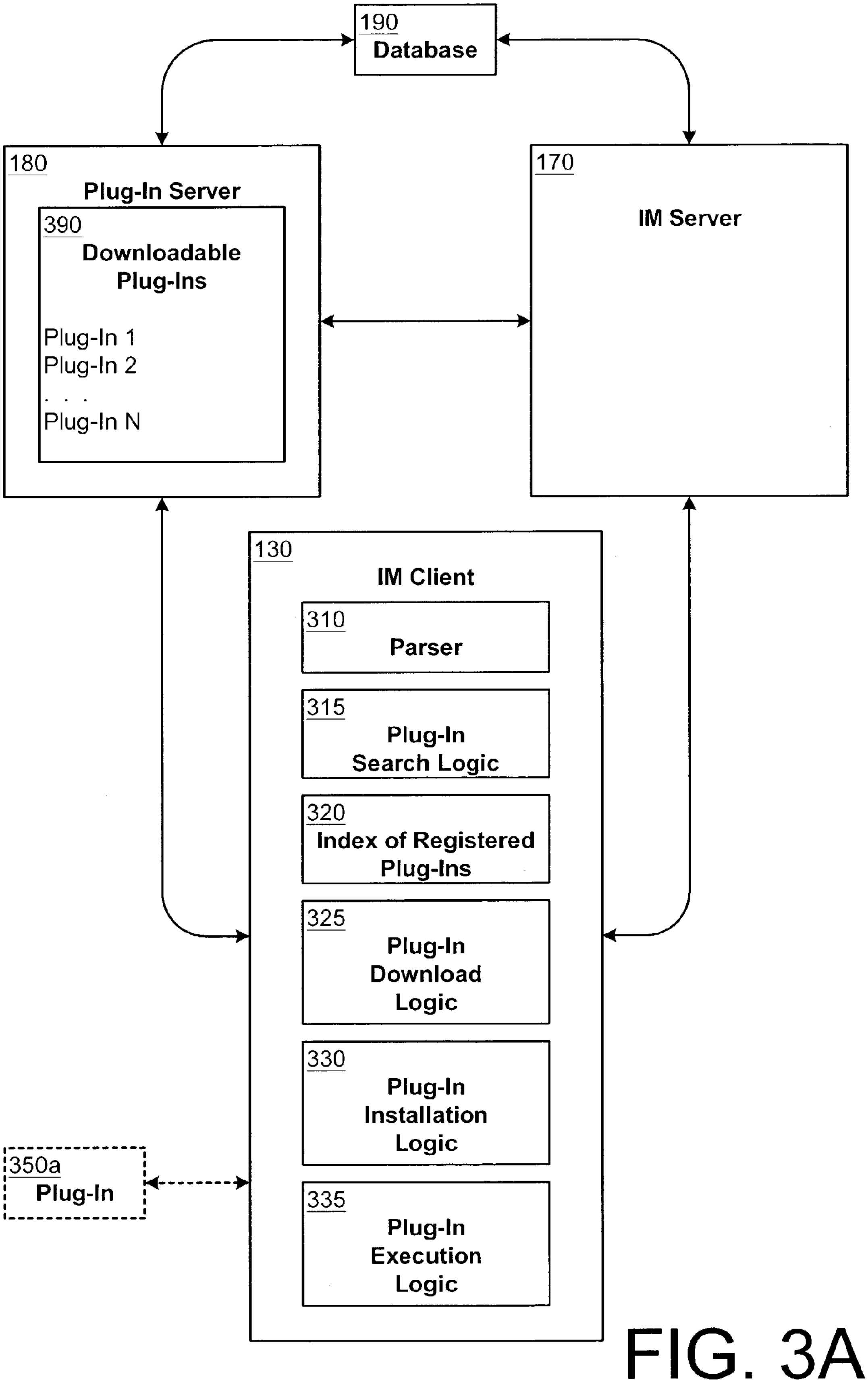
FIG. 3 is a block diagram showing one embodiment of the IM client of FIG. 1 having extended functionality.
Figure 3B:
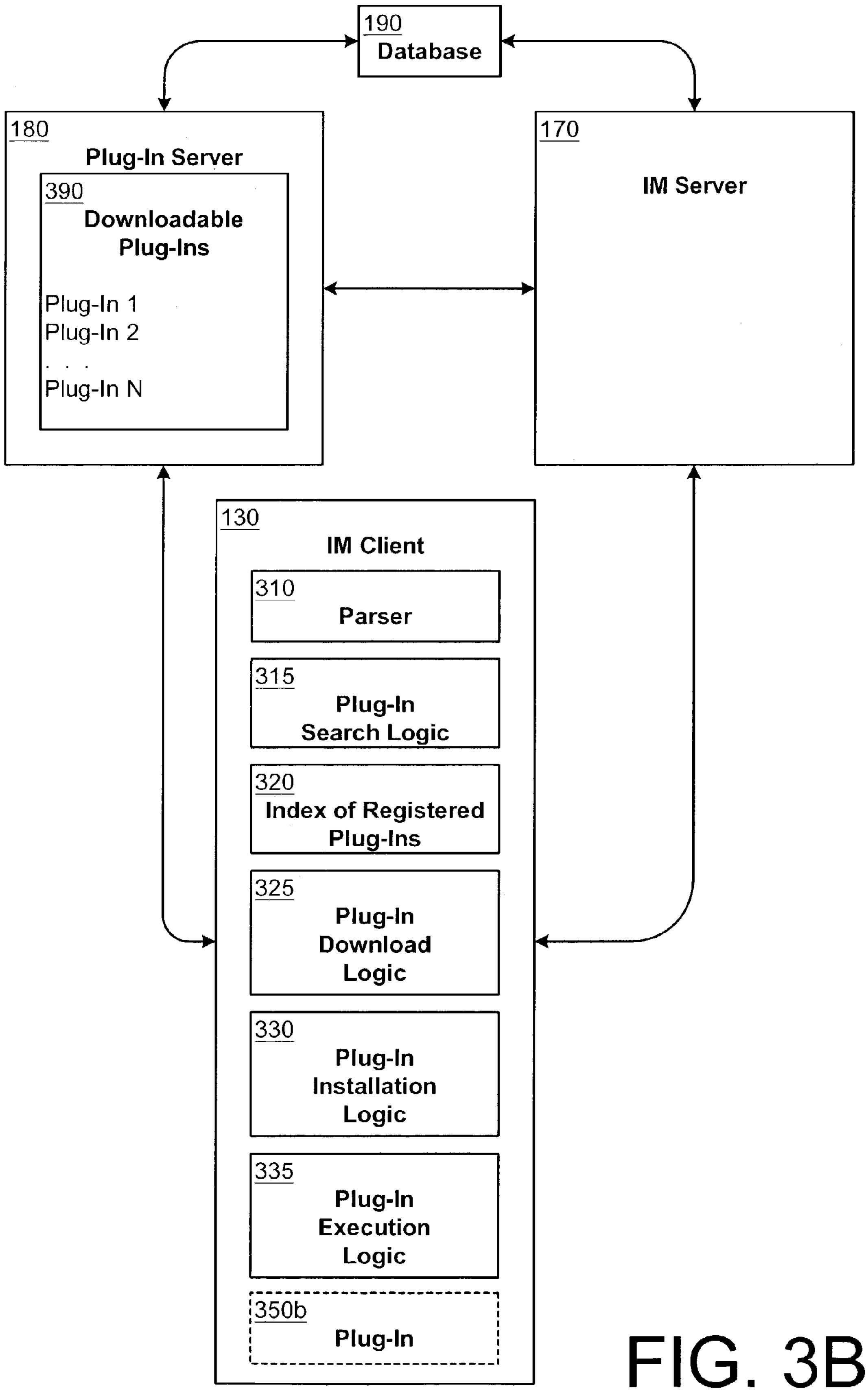

FIG. 3A is a block diagram showing one embodiment of the IM client 130. FIG. 3A also conceptually illustrates the connection between the IM client 130, the IM server 170, the plug-in server 180, and a database 190. The plug-in server 180 comprises one or more downloadable plug-ins 390, which are adapted to extend the functionality of the IM client 130. The downloadable plug-ins 390 may include data encryption and decryption software, specifically-configured Internet web pages, workflow applications, video games (both interactive and non-interactive), digital audio recorders and players, digital video recorders and players, etc. The IM client 130 comprises a parser 310, plug-in search logic 315, an index of registered plug-ins 320, which is correlated to the plug-ins in the listing of installed plug-ins 135, plug-in download logic 325, plug-in installation logic 330, and plug-in execution logic 335.

In an example embodiment, when the IM client 130 is initially launched, plug-in search logic 315 in the IM client 130 searches the predefined plug-in directory 135 to determine which plug-ins are installed in the plug-in directory 135. The installed plug-ins are then registered for subsequent access. Once the IM client 130 is engaged in a server-mediated IM session, the IM client 130 may receive a data stream from the IM server 170. The parser 310 parses the received data stream for an application identifier, which, in some embodiments, is an extensible markup language (XML) tag. In one embodiment, the application identifier may be an XML tag that is correlated to a specific plug-in. For example, the XML tag may identify that the incoming data stream is a digital audio stream, which is to be processed by a digital audio player. Similarly, the XML tag may identify that the incoming data stream is an encrypted data stream, which is to be decrypted by a decryption application. In another embodiment, the application identifier may be a generic tag that has data of a specific multi-purpose Internet mail extension (MIME)-type, which is correlated to a particular application. In that embodiment, the generic tag may be parsed to locate the MIME extension and relate the MIME extension to a specific plug-in.

Once the parser 310 has identified the plug-in, the IM client 130 preferably determines whether or not that plug-in has been registered. If that plug-in has been registered, then the plug-in execution logic 335 launches the plug-in 350. In one embodiment, the launching of the plug-in 350 includes a loading of the plug-in into memory 230, initializing the plug-in, and creating a new instance of the plug-in at the IM client 130. In this regard, multiple instances of a plug-in may be loaded by the IM client 130. As shown in this embodiment, the life cycle of the plug-in is determined by the IM client 130. In this regard, when the IM client 130 shuts down, then the plug-in 350 also shuts down. Conversely, if a helper application is launched, then the life cycle of the helper application need not be governed by the IM client 130. Since life cycle management of plug-ins and helper applications is known to those of skill in the art, further discussion of life cycle management is omitted here.

If the IM client 130 determines that the plug-in has not been registered, then the plug-in download logic 325 downloads the plug-in 350 from the plug-in server 180, and the plug-in installation logic 330 installs the plug-in 350 at the predefined listing. Upon installing the plug-in 350, the IM client registers the plug-in 350 as described above. The registered plug-in 350 is then launched by the plug-in execution logic 335.

Figure 4:
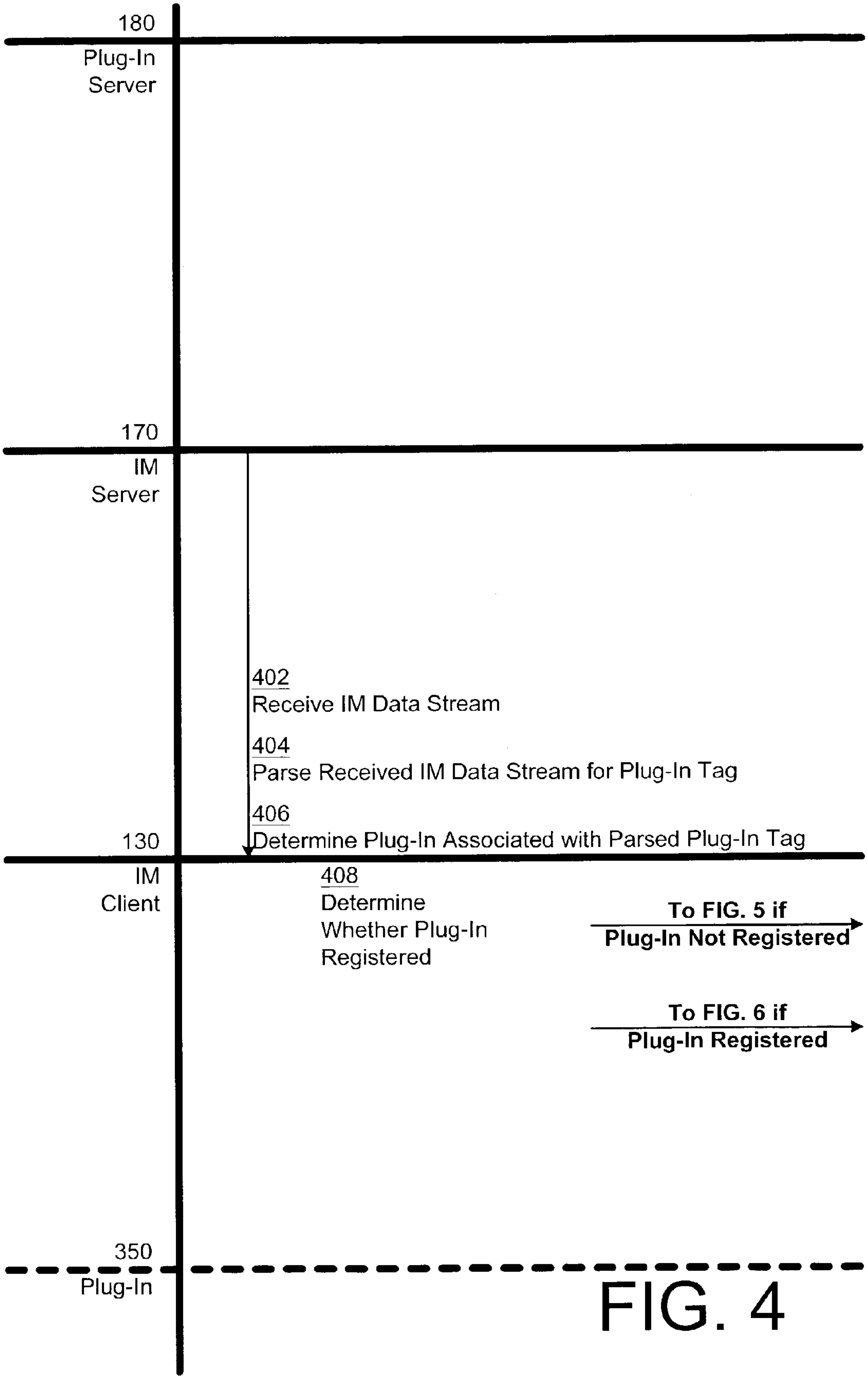
FIGS. 4 through 7 are data flow diagrams showing embodiments of methods for extending IM functionality, which may be performed by the systems of FIG. 3A or 3B.

FIGS. 4 through 7 are data flow diagrams showing embodiments of methods for extending IM functionality. As shown in FIG. 4, one embodiment of the method begins when an IM client 130 receives (402) an IM data stream. The embodiment of FIG. 4 shows the IM data stream being received from an IM server 170. However, it should be appreciated that, in a peer-to-peer environment, the IM data stream may be directly received from another IM client (not shown). The IM client 130 parses (404) the IM data stream for an application identifier. In some embodiments, the application identifier may be a plug-in tag that specifies a particular plug-in, while, in another embodiment, the application identifier may be a generic tag that includes data of a particular MIME type, which is registered for a particular plug-in. Upon parsing (404) the IM data stream, the IM client 130 determines (406) the particular plug-in that is associated with the application identifier. For example, if the tag indicates that the data is a digital audio stream, then the IM client 130 determines a digital audio player plug-in to be the proper plug-in. Similarly, if the tag indicates that the data is an incoming workflow request, then the IM client 130 determines that a workflow application is the proper plug-in. Upon determining (406) the proper plug-in, the IM client 130 further determines (408) whether or not it is registered with the plug-in. If the IM client 130 is not registered with the plug-in, then the process continues to FIG. 5. Alternatively, if the IM client 130 is registered with the plug-in, then the process continues to FIG. 6.

Figure 5:
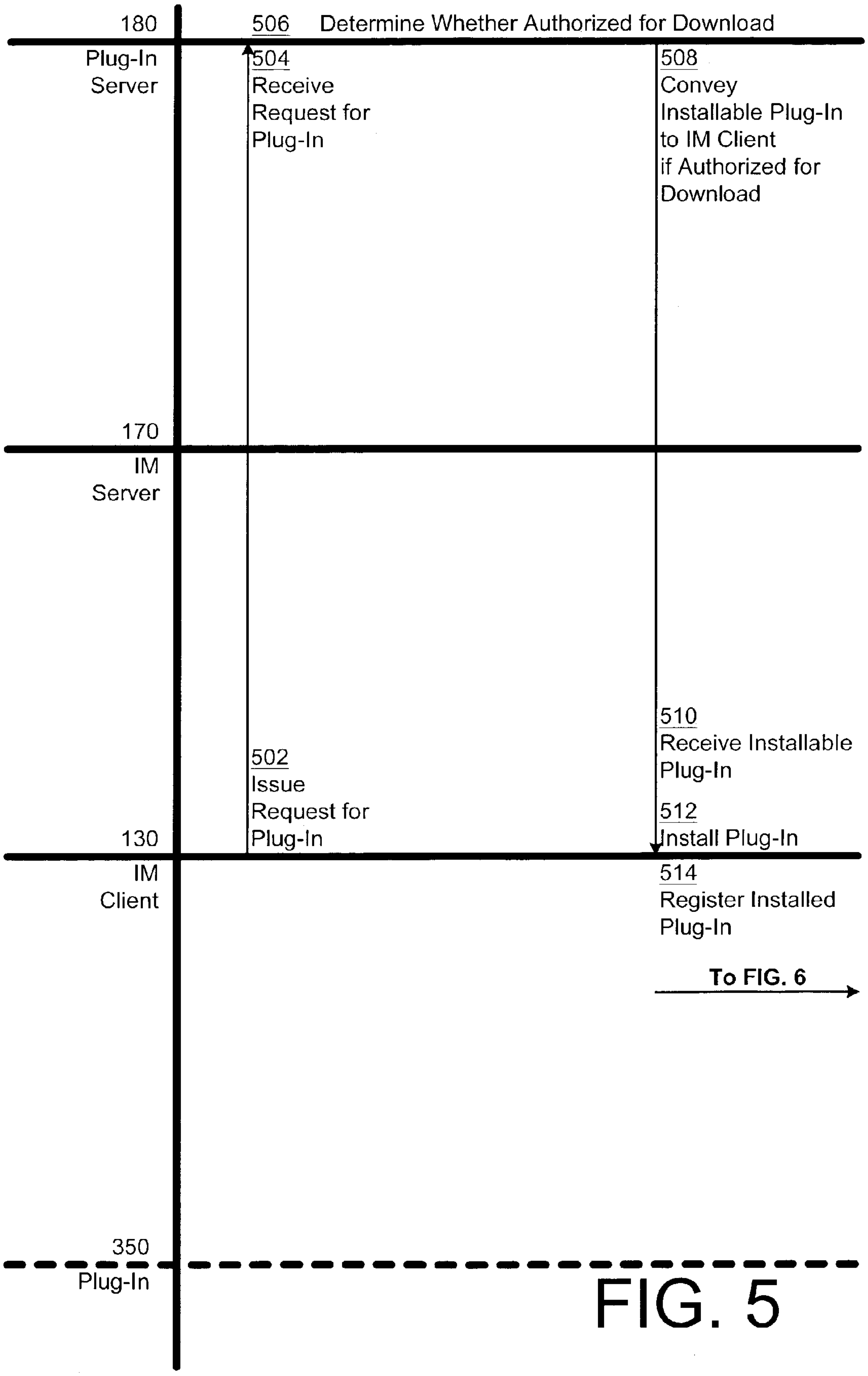

As shown in FIG. 5, if the IM client 130 is not registered with the plug-in, then the IM client 130 issues (502) a request for the plug-in to a plug-in server 180. In one embodiment, the plug-in server 180 may be configured such that all of the plug-ins at the plug-in server 180 are publicly accessible to every IM user who requests a plug-in. In another embodiment, the IM system may be configured so that IM users have different access levels for different plug-ins. For example, a digital audio player plug-in may be accessible to all IM users while a digital video plug-in may only be accessible to specified IM users. In another example, a workflow plug-in may only be accessible to those IM users who are authorized participants designated by a workflow server. Similarly, an interactive game plug-in may only be accessible to those IM users who have subscribed to the interactive game.

In the embodiment where different IM users have different access levels, the issued (502) request may include an access code or an electronic certificate indicating an authorized download. Since many different approaches to restricting downloads are known to those of skill in the art, further discussion of authorized downloads is omitted here. Once the request has been issued (502) by the IM client 130, the plug-in server 180 receives (504) the request for the plug-in and determines (506) whether or not the request includes an authorization to download the plug-in. In one embodiment, this may be done by comparing a received access code with a database having a list of approved access codes. Once the plug-in server 180 has determined (506) that the download is authorized, then the plug-in server 180 conveys (508) the appropriate installable plug-in to the IM client 130. The IM client 130 receives (510) the installable plug-in and installs (512) the plug-in. The installed (512) plug-in is then registered (514). In one embodiment, the plug-in is registered as a COM object in the Windows™ registry under a directory in "HKEY_LOCAL_MACHINE/SOFTWARE/."

Figure 6:
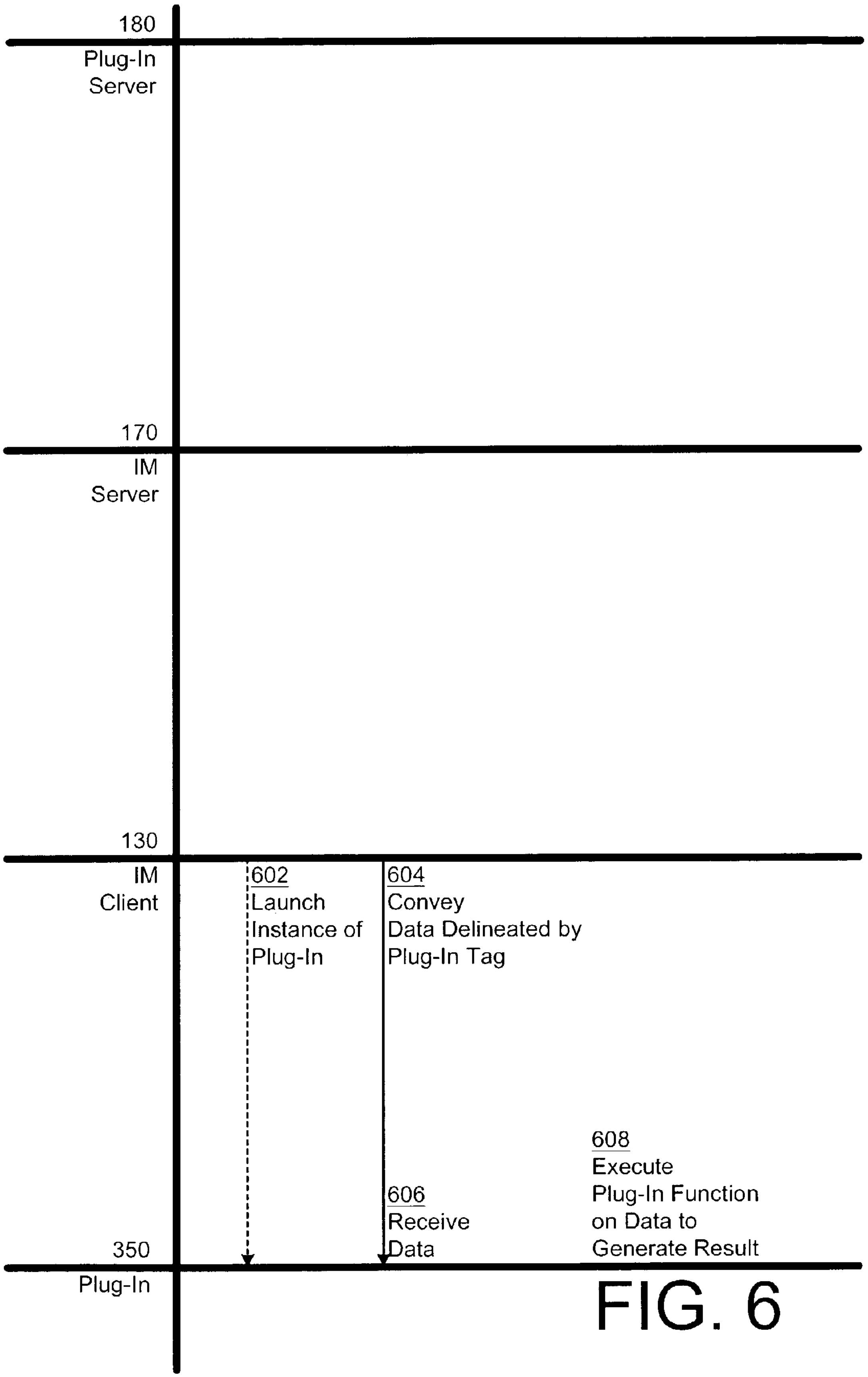
Figure 7:
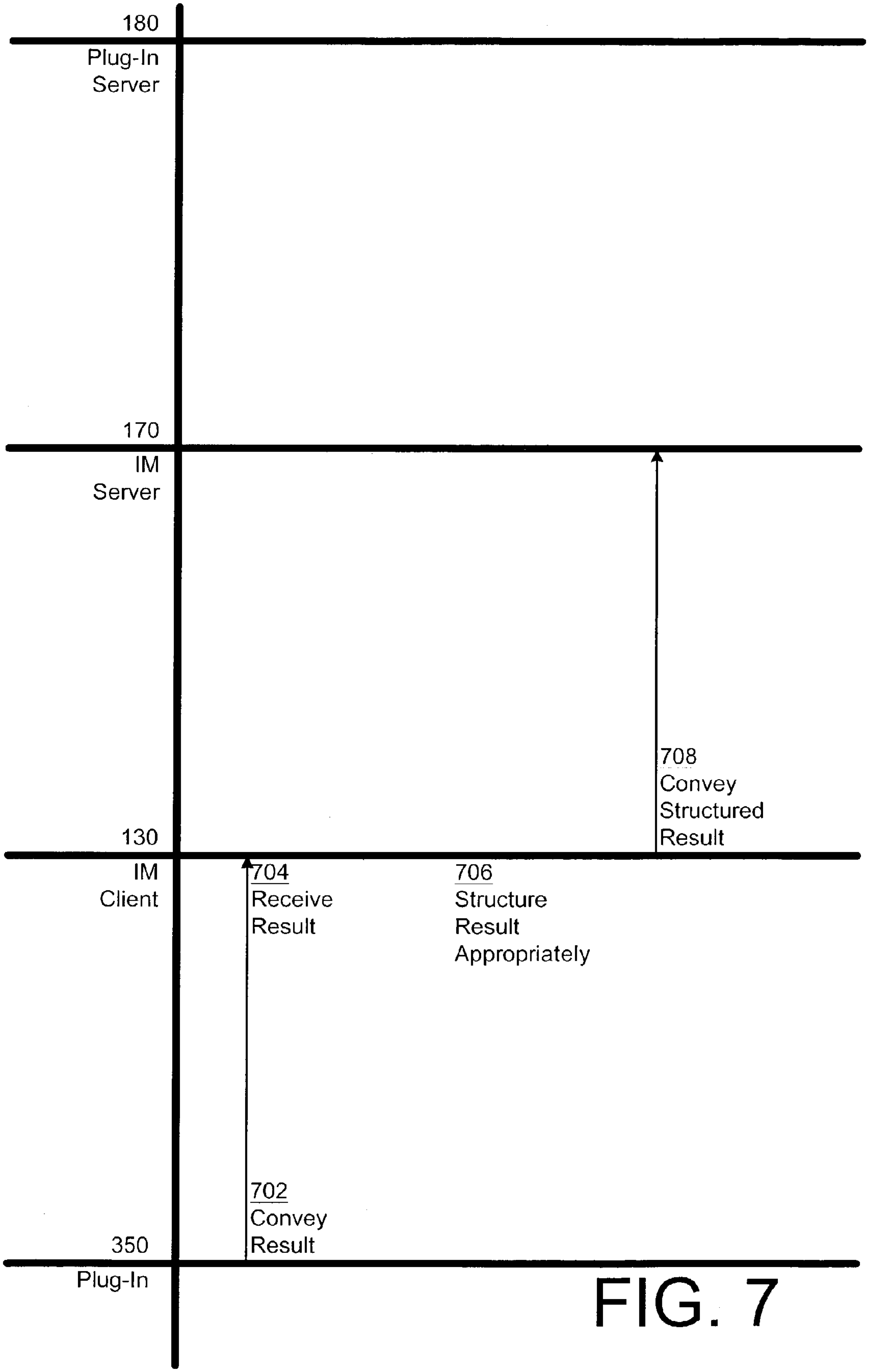

As shown in FIG. 6, once the proper plug-in has been registered, the IM client 130 launches (602) the plug-in 350 by loading the plug-in 350 into memory, initializing the plug-in 350, and creating an instance of the plug-in 350 at the IM client 130. The IM client 130 then conveys (604) to the plug-in 350 any data that may be delineated by the application identifiers in the received data streams. The plug-in 350 receives (606) the data and executes (608) a function defined by the plug-in with the data to generate a result. For example, if the data is a digital audio stream, then the plug-in may play the digital audio stream. Similarly, if the data is part of an interactive video game, then the plug-in may provide a gaming environment.

If the plug-in is part of an interactive software application (e.g., workflow application, interactive video game, Internet-based conferencing, etc.), then the result may be a prompt for feedback from a user at the IM client 130. In this regard, if the plug-in is an interactive program, then the process may continue to FIG. 7, where the plug-in receives (702) input from a user. Upon receiving (702) the input, the plug-in conveys (704) data, which is indicative of the input, to the IM client 130. The IM client 130 receives (706) the data and structures (708) the data so that it may be transmitted using an IM message. The structured data is then conveyed (708) to the IM server 170. Again, while the embodiment of FIGS. 4 through 7 show a server-mediated IM process, it should be appreciated that the described methods are equally applicable in peer-to-peer IM processes.

Figure 8:
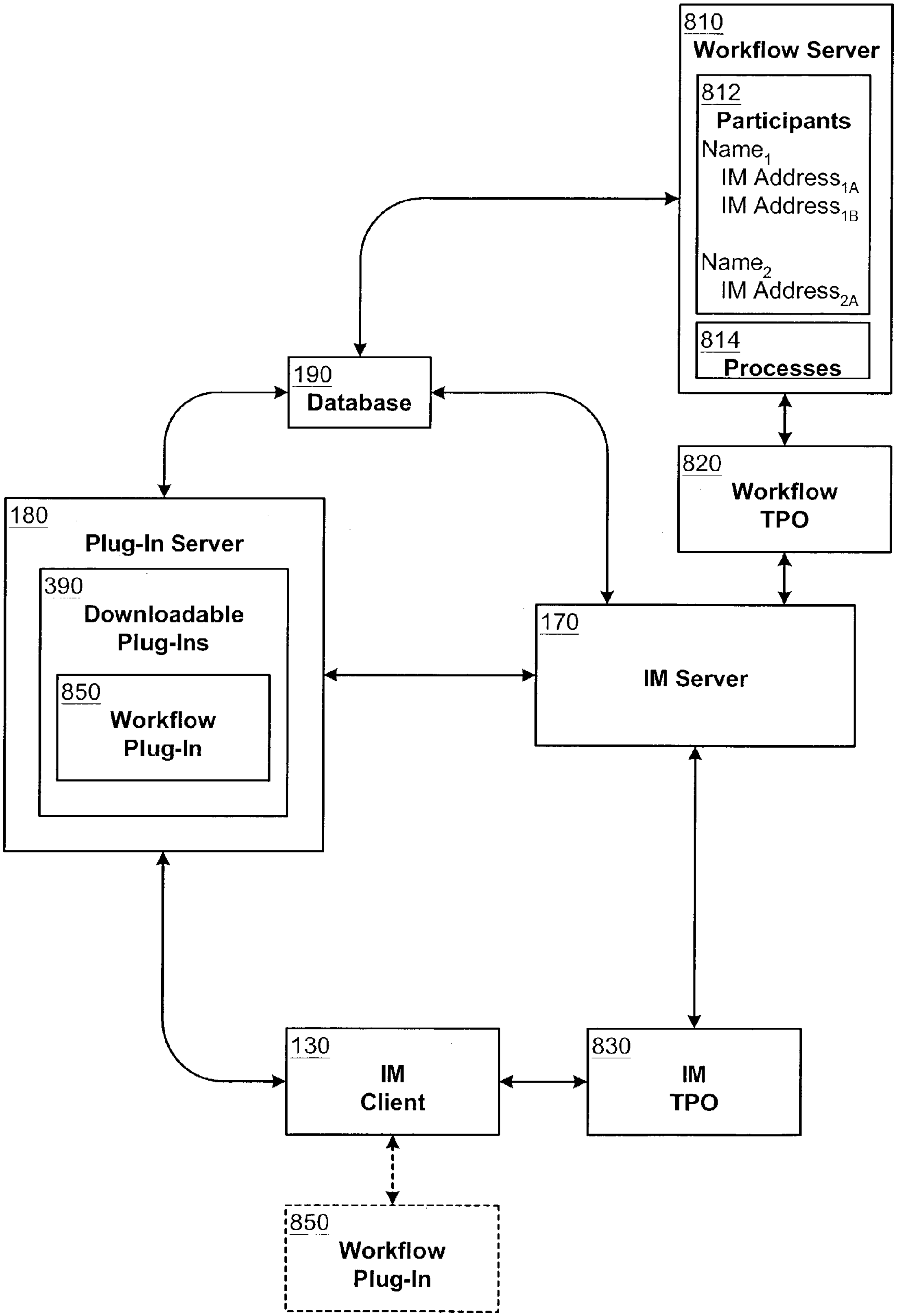
FIG. 8 is a block diagram showing one embodiment of the IM client of FIG. 1 that is specifically configured to incorporate workflow functionality.

FIG. 8 is a block diagram showing another embodiment of the IM client 130 of FIG. 1. The IM client 130 of FIG. 8 is specifically configured to incorporate workflow functionality. As shown in FIG. 8, one embodiment of the system includes an IM client 130 in communication with an IM server 170 through an IM transport protocol object (TPO) 830. In this regard, the IM TPO 830 is adapted to receive messages from the IM server 170 and convey the received messages to the IM client 130. Similarly, the IM TPO 830 is adapted to receive messages from the IM client 130 and convey the received messages to the IM server 170. Since the behavior of the IM TPO 830 is described in greater detail in the above-referenced applications, further discussion of the IM TPO 830 is omitted here. However, it should be appreciated that the IM TPO 830 is configured so that messages generated by the IM client 130 are reformatted for compatibility with the IM server 170, and vice versa.

The system of FIG. 8 also includes a workflow server 810 in communication with the IM server 170 through a workflow TPO 820. The workflow server 810 is adapted to control workflow processes 814 and manage workflow participants 812 that are associated with the various workflow processes 814. In this regard, the workflow server 170 generates workflow requests and receives responses to the requests in accordance with the workflow processes 814. Similar to the IM TPO 830, the workflow TPO 820 provides compatibility between the IM server 170 and the workflow server 810. Since the workflow server 810 may use a protocol that is incompatible with IM, the workflow TPO 820 translates messages generated by the workflow server 810 into IM-compatible messages. Similarly, the workflow TPO 820 translates IM messages generated by the IM server 170 into a protocol that is compatible with the workflow server 810.

The system of FIG. 8 further comprises a plug-in server 180 having various downloadable plug-ins 390 including a workflow plug-in 850. The plug-in server 180 is coupled to the IM client 130, thereby permitting the IM client 130 to download appropriate plug-ins from the plug-in server 180. The workflow server 810, the IM server 170, and the plug-in server 180 are coupled to a database 190. The database 190 may include an access code as described with reference to FIG. 5.

In operation, the workflow server 810 generates a workflow request identifying a particular workflow participant (e.g., an IM address of a workflow participant). The workflow request is relayed to the workflow TPO 820, which queries the IM server 170 to determine whether or not the workflow participant is present. In other words, for example, the workflow TPO 820 determines whether the IM address of the workflow participant indicates that the workflow participant is online. If the workflow participant is present, then the workflow TPO 820 reformats the workflow request into an IM-compatible message and conveys the IM-compatible message to the IM server 170. The IM server 170 relays the IM-compatible message to the IM TPO 830, which translates the IM-compatible message into a workflow request that is compatible with the IM client 130. The translated workflow request is relayed message to the IM client 130. The IM client 130 receives the translated workflow request and launches a workflow plug-in 850 to process the translated workflow request by, for example, prompting the workflow participant for a response. If the workflow participant responds to the request, then the response is conveyed from the workflow plug-in 850 to the IM client 130. The IM client 130 relays the response to the IM TPO 830, which translates the response into an IM-compatible message. The IM-compatible message is conveyed to the IM server 130, which further relays the IM-compatible message to the workflow TPO 820. The workflow TPO 820 reformats the response into the protocol of the workflow server 810 and conveys that response to the workflow server 810.

As seen from the embodiment of FIG. 8, employing an IM system to convey workflow requests and responses results in fewer false-delivery messages. In other words, unlike email-based workflow processes in which only delivery confirmation of the email is generally possible, the IM-based workflow process provides real-time notification as to whether or not the workflow participant received a request by delivering requests to the participant after verifying that the participant is present. Thus, by delivering a workflow request to only those workflow participants who are present, the system of FIG. 8 provides a more accurate and efficient confirmation of delivery than workflow processes that utilize email. Several embodiments of IM-based workflow processes are described with reference to FIGS. 9 through 17.

Figure 9:
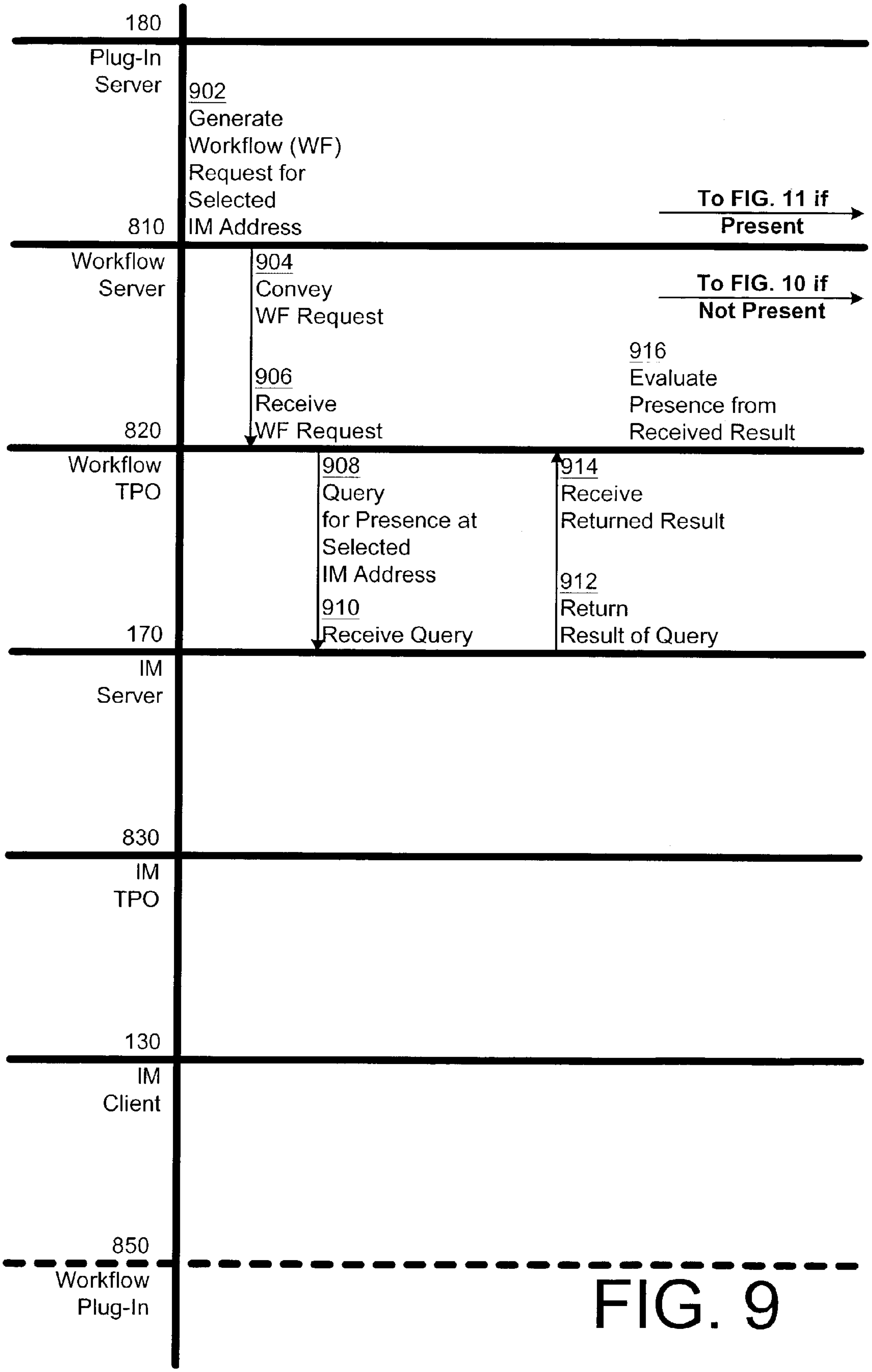
FIGS. 9 through 17 are data flow diagrams showing embodiments of methods for extending IM functionality, which may be performed by the system of FIG. 8.

FIGS. 9 through 17 are data flow diagrams showing embodiments of methods for extending IM functionality. As shown in FIG. 9, one embodiment of the process begins when a workflow server 810 generates (902) a workflow request for a selected IM address for a workflow particpant. The generated (902) workflow request is conveyed (904) from the workflow server 810 to a workflow TPO 820, which receives (906) the workflow request and queries (908) an IM server 170 to determine whether or not the selected IM address is present on the network. The IM server 170 receives (910) the query and returns (912) a result to the workflow TPO 820. The workflow TPO 820 receives (914) the result and evaluates (916) the result for presence of the selected IM address. If the result indicates that the selected IM address is present on the network, then the process continues to FIG. 11. If, on the other hand, the result indicates that the selected IM address is not present on the network, then the process continues to FIG. 10.

Figure 10:
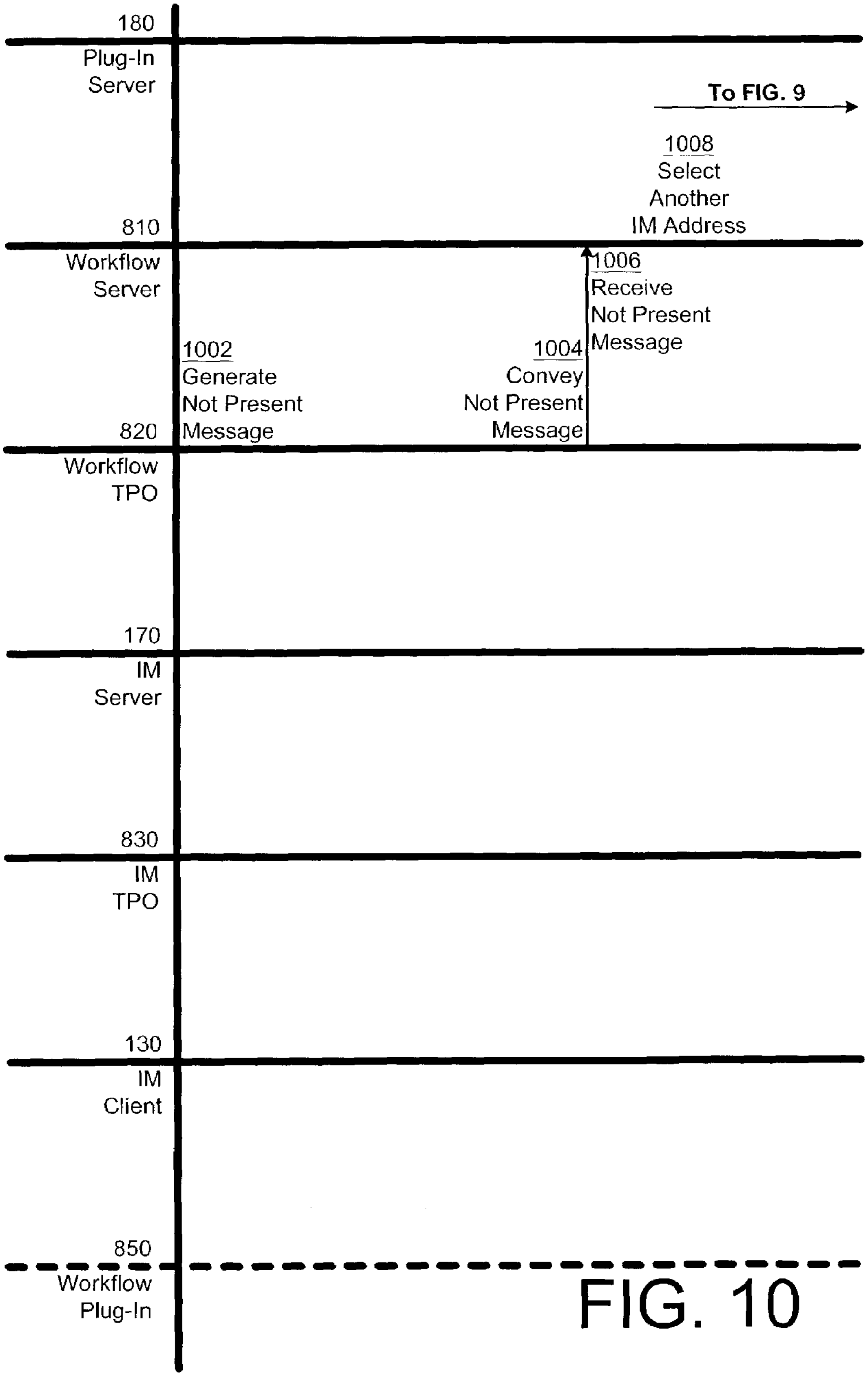

As shown in FIG. 10, if the selected IM address is not present, then the workflow TPO 820 generates (1002) a not-present message and conveys (1004) the not-present message to the workflow server 810. The workflow server 810 receives (1006) the not-present message and selects (1008) another IM address related to the workflow participant. Once another IM address has been selected (1008), the process returns to FIG. 9.

Figure 11:
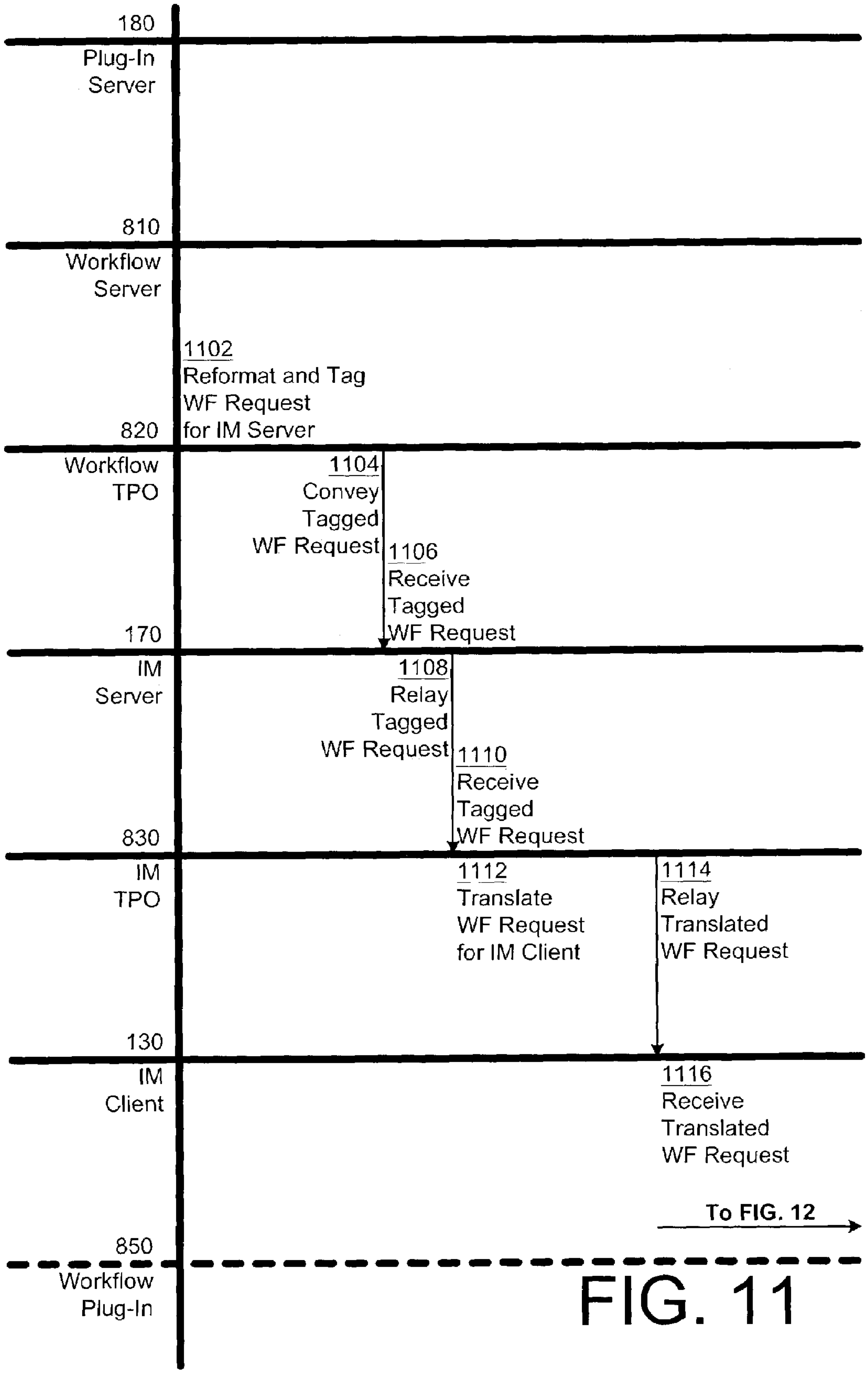

If the selected IM address is present on the network, then the workflow TPO 820 reformats (1102) and tags the workflow request, as shown in FIG. 11, so that the workflow request is IM compatible. In one embodiment, the workflow request is tagged with an extensible markup language (XML) tag, which indicates that the request is a workflow request. In another embodiment, the workflow request is tagged with a generic XML tag, which indicates that a particular workflow-related message is embedded in the workflow request. In either event, the tagged workflow request is conveyed (1104) to the IM server 170. The IM server 170 receives (1106) the tagged workflow request and relays (1108) the tagged workflow request to an IM TPO 830. The IM TPO 830 receives (1110) the tagged workflow request and translates (1112) the workflow request for an IM client 130. The translated workflow request is relayed (1114) to the IM client 130, which receives (1116) the translated workflow request.

Figure 12:
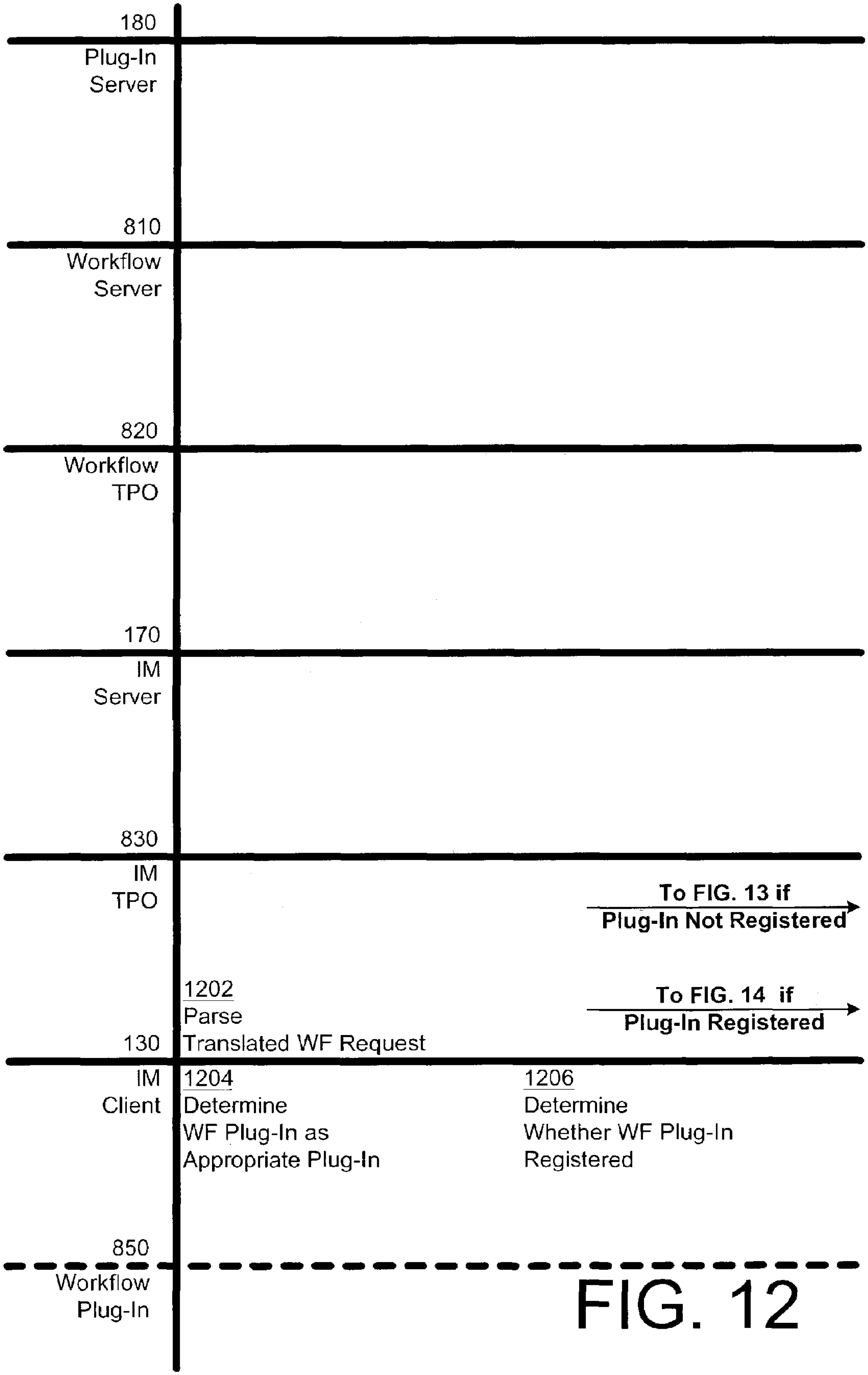

The process continues to FIG. 12 where the IM client 130 parses (1202) the translated workflow request for the particular tags (e.g., XML workflow tags). Upon parsing (1202) the workflow request, the IM client 130 determines (1204) from the parsed tags that a workflow plug-in is the appropriate plug-in for processing the received workflow request. Upon determining (1204) that the workflow plug-in is the appropriate plug-in, the IM client 130 further determines (1206) whether or not the IM client 130 is registered with the workflow plug-in. Since the registering of the IM client 130 with plug-ins is described above, further discussion of registering IM clients is omitted here.

Figure 13:
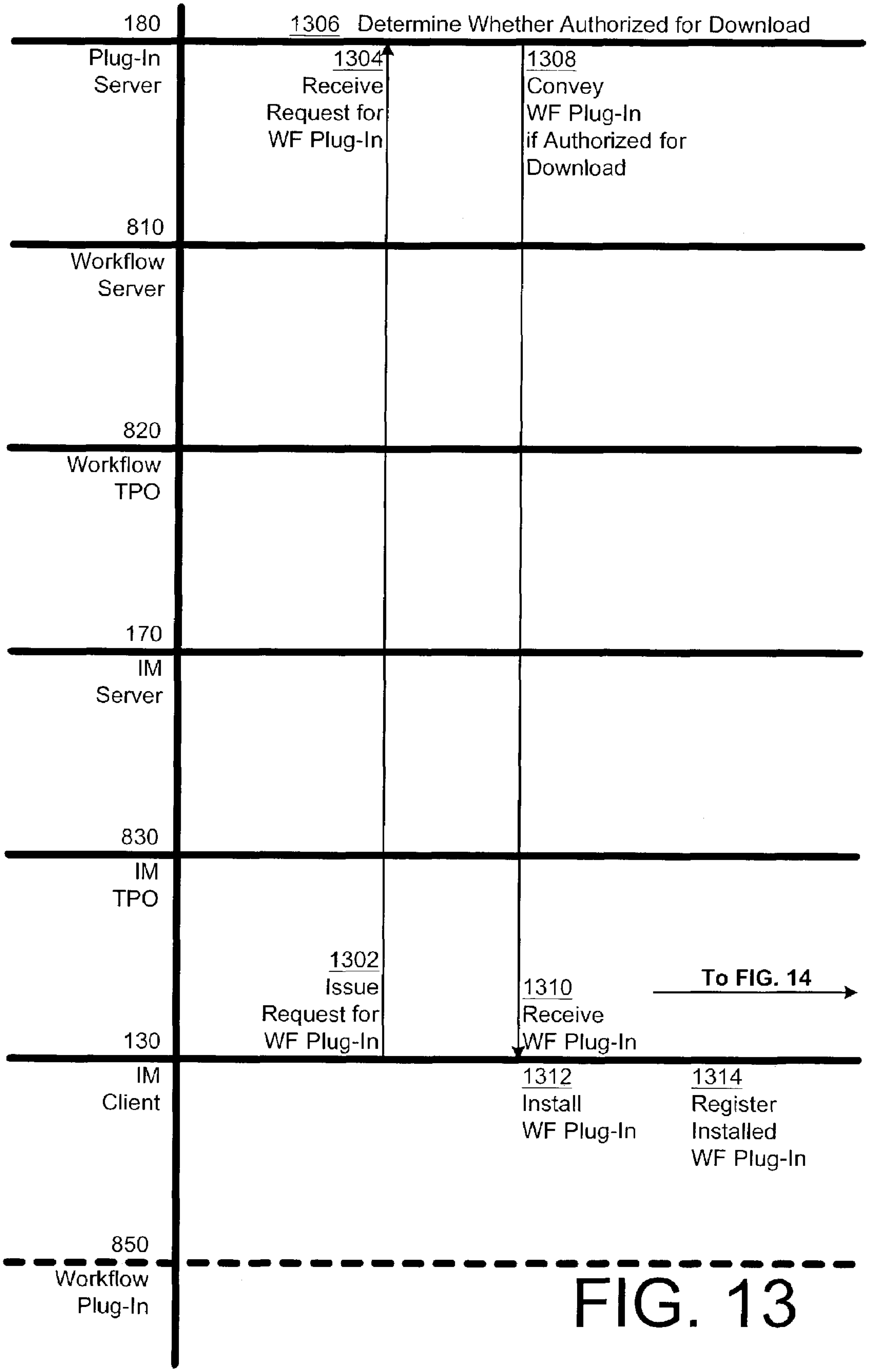
Figure 14:
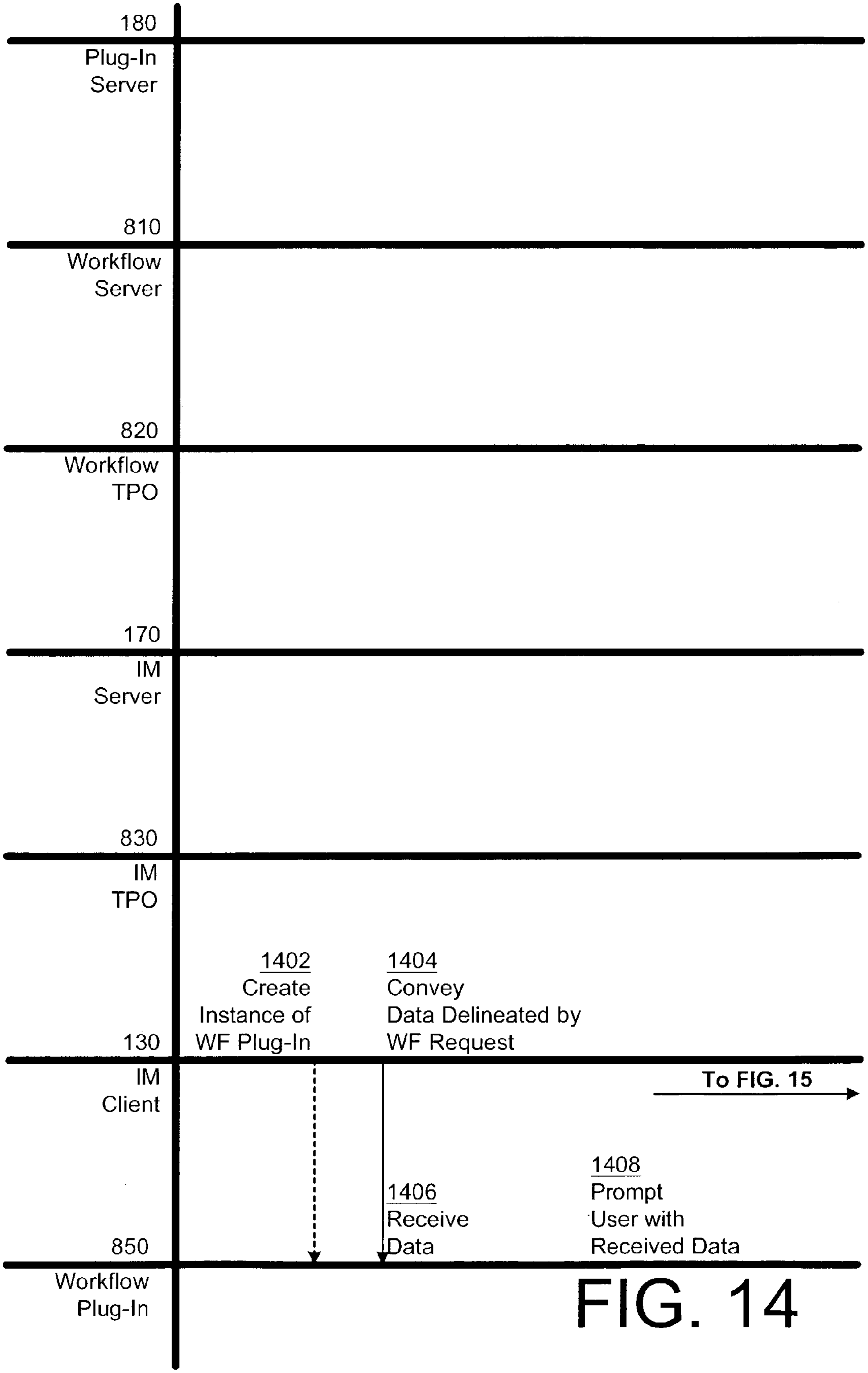

If the IM client 130 determines (1206) that the IM client 130 is registered with the workflow plug-in, then the process continues to FIG. 14. However, if the IM client 130 determines that the IM client 130 is not registered with the workflow plug-in, then the process continues to FIG. 13.

As shown in FIG. 13, if the IM client 130 is not registered with the workflow plug-in, the IM client 130 issues (1302) a request to a plug-in server 180 for the workflow plug-in. In one embodiment, the system may be configured so that only authorized users or participants may retrieve the workflow plug-in. In another embodiment, the workflow plug-in may be accessible to all users that request the workflow plug-in. If only authorized participants are permitted access to the workflow plug-in, then the plug-in server 180 receives (1304) the request and determines (1306) whether or not the request includes authorization to retrieve (or download) the workflow plug-in. If it is determined (1306) that the download is authorized, then the plug-in server 180 conveys (1308) the workflow plug-in to the IM client 130. The IM client 130 receives (1310) the workflow plug-in, installs (1312) the workflow plug-in, and registers (1314) the IM client 130 with the installed workflow plug-in.

As shown in FIG. 14, when the IM client 130 is registered with the workflow plug-in, the IM client 130 creates (1402) an instance of the workflow plug-in 850. Upon creating (1402) the instance of the workflow plug-in 850, the IM client conveys (1404) data that is delineated by the tags in the workflow request to the workflow plug-in 850. The workflow plug-in receives (1406) the data and processes the data. In one embodiment, the processing of the data includes the step of prompting (1408) a user for a response to the received data.

Figure 15:
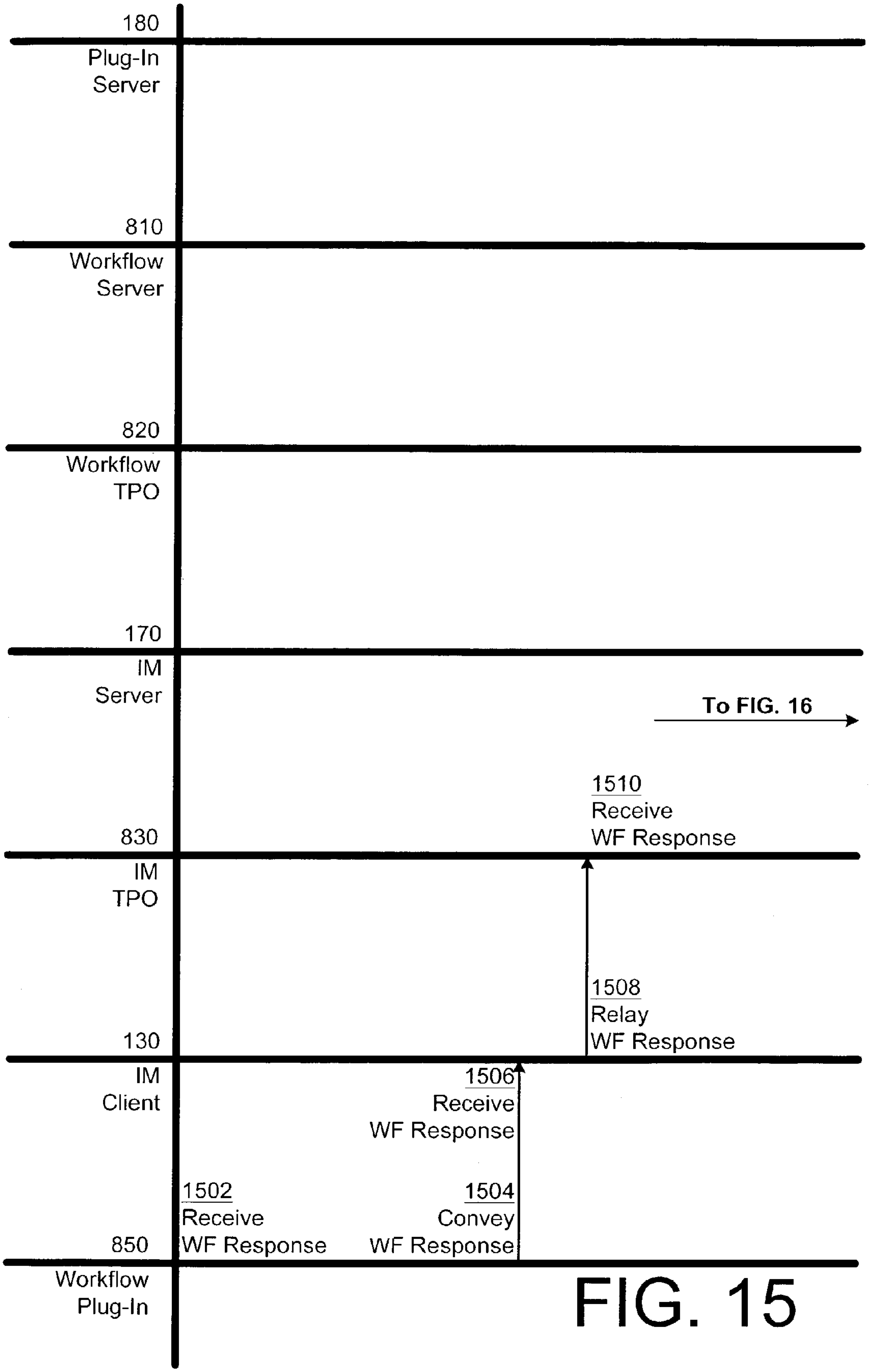

If a user is prompted (1408) for a response and the user provides a response, then the process continues to FIG. 15 where the workflow plug-in 850 receives (1502) the workflow response from the user and conveys (1504) the workflow response to the IM client-130. The IM client receives (1506) the workflow response and relays (1508) the workflow response to the IM TPO 830. The IM TPO 830 receives (1510) the workflow response and the process continues to FIG. 16.

Figure 16:
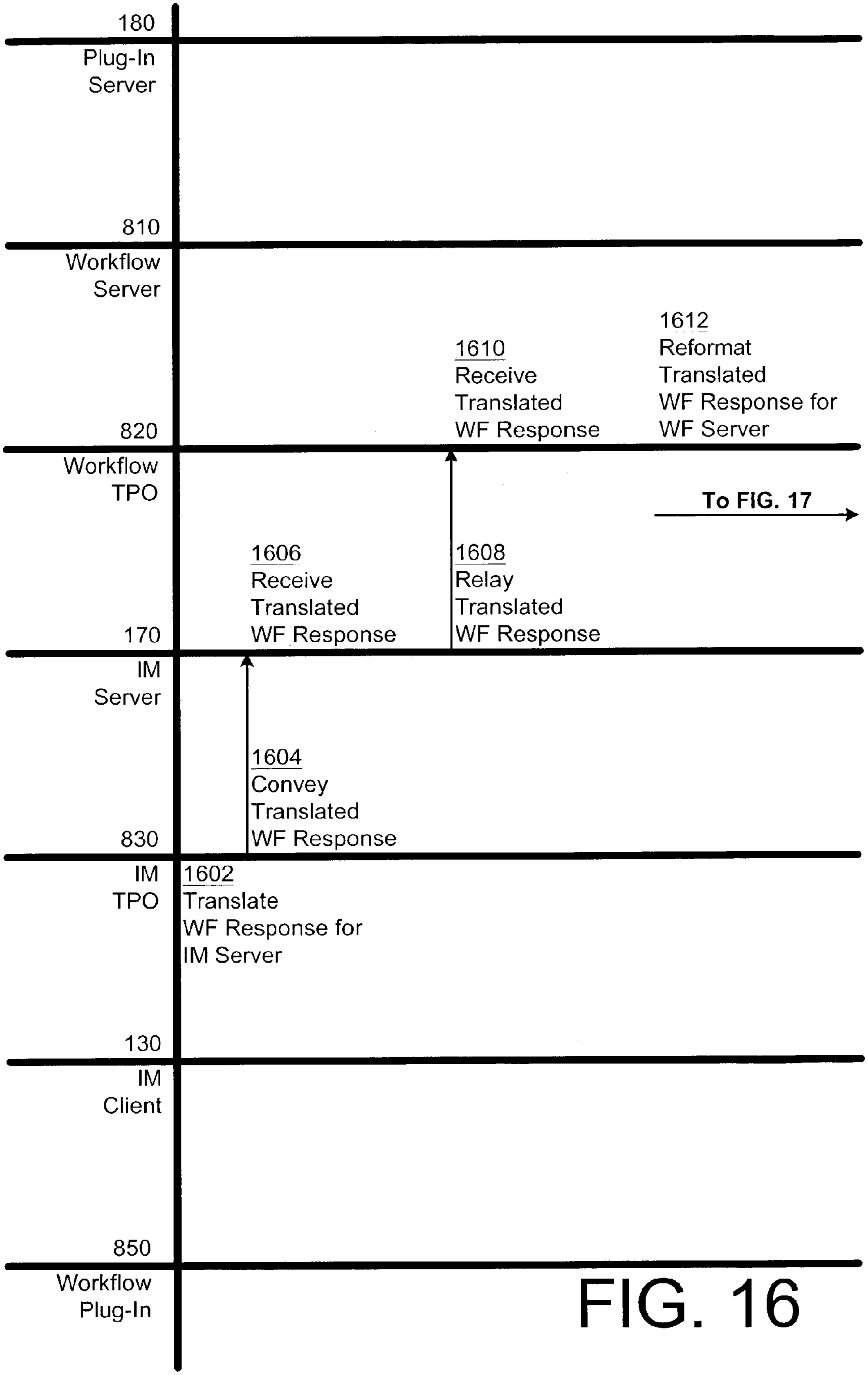

As shown in FIG. 16, the IM TPO 830, upon receiving (1510) the workflow response from the IM client 130, translates (1602) the workflow response into an IM-compatible workflow response. The translated workflow response is conveyed (1604) to the IM server 170. The IM server 170 receives (1606) the translated workflow response and relays (1608) the translated workflow response to the workflow TPO 820. The workflow TPO 820 receives (1610) the translated workflow response and reformats (1612) the translated workflow response into the protocol of the workflow server 810.

Figure 17:
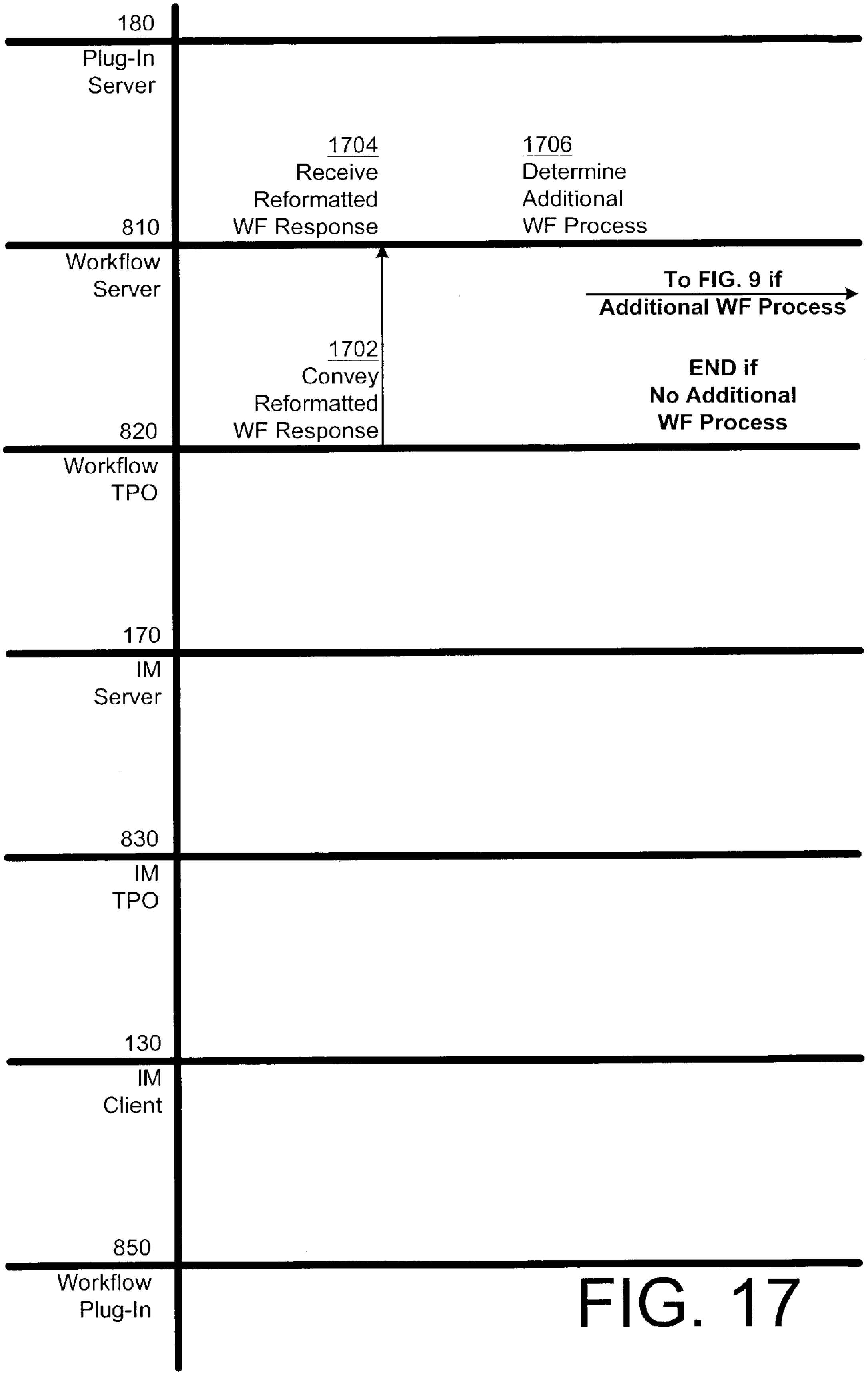

The process continues to FIG. 17 where the workflow TPO 820 conveys (1702) the reformatted workflow response to the workflow server 810. The workflow server 810 receives (1704) the reformatted workflow response and determines (1706) whether or not additional workflow processes should be executed. If it is determined (1706) that additional workflow processes should be executed, then the process returns to FIG. 9. If, on the other hand, it is determined that no additional workflow processes are to be executed, then the process ends.

As shown with reference to FIGS. 9 through 17, by employing IM to convey workflow messages, the presence aspect of IM may be used to more accurately confirm delivery of workflow requests. Additionally, by employing IM, which is substantially a real-time mode of communication, workflow processes may be accelerated. In other words, unlike prior systems employing email in which a reply may be significantly delayed, the IM-based workflow process is a more streamlined process.

The IM client 130, the parser 310, the plug-in search logic 315, the plug-in download logic 325, the plug-in installation logic 330, the plug-in execution logic 335, the plug-in 350, the workflow plug-in 850, and the downloadable plug-ins 390 of the present invention can be implemented in hardware, software, firmware, or a combination thereof. In the preferred embodiment(s), the IM client 130, the parser 310, the plug-in search logic 315, the plug-in download logic 325, the plug-in installation logic 330, the plug-in execution logic 335, the plug-in 350, the workflow plug-in 850, and the downloadable plug-ins 390 are implemented in software or firmware that is stored in a memory and that is executed by a suitable instruction execution system. If implemented in hardware, as in an alternative embodiment, the IM client 130, the parser 310, the plug-in search logic 315, the plug-in download logic 325, the plug-in installation logic 330, the plug-in execution logic 335, the plug-in 350, the workflow plug-in 850, and the downloadable plug-ins 390 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The processes of FIGS. 4 through 7 and FIGS. 9 through 17 may be executed by computer code comprising an ordered listing of executable instructions for implementing logical functions. In this regard, the computer code may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations may be made, none of which depart from the spirit of the present invention. For example, while the preferred embodiments illustrate plug-ins that are created and destroyed by the IM client, it should be appreciated that IM functionality may be extended by using helper applications that are executed as separate, free-standing applications. Additionally, while a specific embodiment of a workflow plug-in is shown with reference to FIGS. 8 through 17, it should be appreciated that a video game plug-in, an audio plug-in, a video plug-in, or any number of other applications may be implemented using the systems and processes described above. Specifically, it should be appreciated that the embodiments described above are particularly conducive to interactive applications such as interactive video games or interactive business applications. In this regard, it should be appreciated that the above-described approaches may be extended to any application that is amenable to interaction by multiple users.

All such changes, modifications, and alterations should therefore be seen as within the scope of the present invention.

What is claimed is:

1. A communication method comprising:

receiving a workflow request from a workflow server, the workflow request being directed to a specified instant messaging (IM) address;

formatting the received workflow request to generate an IM data stream;

tagging the workflow request with an Extensible Markup Language (XML) tag; and conveying the workflow request to an IM transport protocol object (TPO), the TPO configured for translating the IM data stream to a desired IM protocol, wherein the XML tag includes at least one of the following: a generic XML tag configured to indicate presence of a workflow-related message and an XML tag configured to indicate the workflow request.

2. The communications method of claim 1, further comprising issuing a query for presence information to the IM server, the presence information being related to the specified IM address.

3. The communications method of claim 2, further comprising receiving presence information from the IM server in response to the query for presence information.

4. The communications method of claim 3, further comprising:

generating an error message in response to receiving presence information indicating that a user is not present; and conveying the generated error message to the workflow server.

5. A communication method comprising:

receiving a workflow request from a workflow server, the workflow request being directed to a specified instant messaging (IM) address;

formatting the received workflow request to generate an IM data stream;

tagging the workflow request with an Extensible Markup Language (XML) tag;

conveying the workflow request to an IM server;

receiving an IM response from the IM server, the IM response being indicative of a response to the workflow request;

formatting the IM response to generate a workflow response; and conveying the workflow response to the workflow server, wherein conveying workflow request to the IM server includes conveying the workflow request to an IM transport protocol object (TPO), the TPO configured for translating the IM data stream to a desired IM protocol.

6. The communications method of claim 5, further comprising issuing a query for presence information to the IM server, the presence information being related to the specified IM address.

7. The communications method of claim 6, further comprising receiving presence information from the IM server in response to the query for presence information.

8. The communications method of claim 7, further comprising:

generating an error message in response to receiving presence information indicating that a user is not present; and conveying the generated error message to the workflow server.

* * * * *